Oct. 30, 1928.
T. VAN DEN ENDE
1,689,262
PLANTING MACHINE FOR CABBAGE AND OTHER PLANTS
Filed Sept. 2, 1926
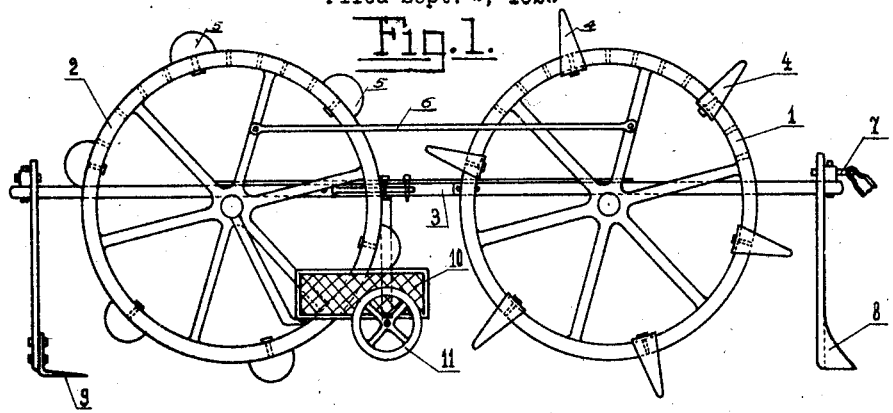
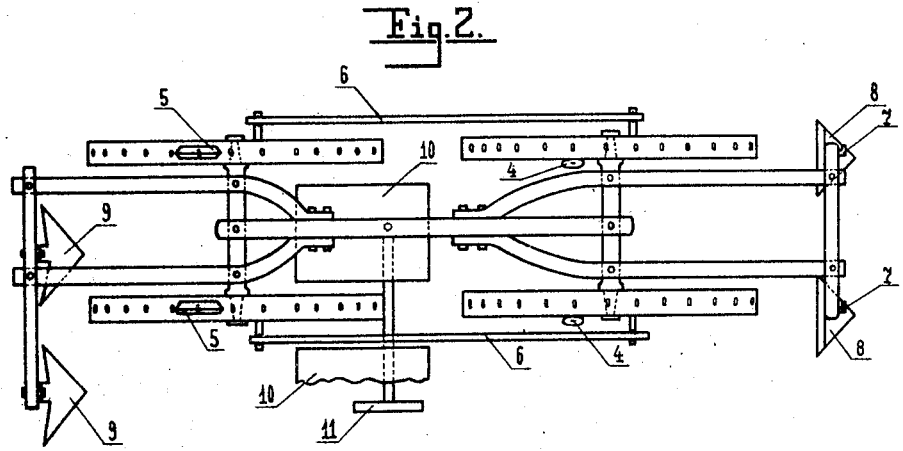
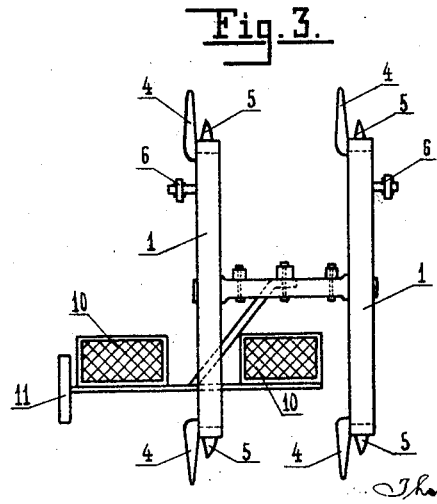

Patented Oct. 30, 1928.

1,689,262

UNITED STATES PATENT OFFICE.

THOMAS VAN DEN ENDE, OF MAASDIJK, NETHERLANDS.

PLANTING MACHINE FOR CABBAGE AND OTHER PLANTS.

Application filed September 2, 1926, Serial No. 133,249, and in the Netherlands September 2, 1925.

This invention relates to a planting machine and has particular reference to a cabbage planting machine, provided with a dibble wheel and means for closing the holes. The object of the invention is to provide a planting machine which is simple in construction and whereby the position of the plants is not disturbed by the hole closing means.

In the accompanying drawing a form of the invention has been illustrated. It is to be understood, however, that no limitation is necessarily made to the precise structural details therein exhibited, but that changes, alterations and modifications may be made when desired without departing from the scope of the invention.

In the drawings: Fig. 1 is a side view, Fig. 2 is a plan view and Fig. 3 a front elevation of the improved machine constructed in accordance with the invention.

The machine comprises a frame 3, consisting of two forks, connected together. The front wheels 1 are arranged on one of the forks and the rear wheels 2 are arranged on the other to run in the same track. These front and rear wheels have the same diameter and are provided with rims about four inches in width. In these rims, holes or openings are arranged at equal distances, the holes in the front wheels being tapered in order to attach the ground opening members or planting spades 4 and the holes in the rear wheels being straight for attaching pressing feet 5 serving to close by pressure the plant holes made by the planting spades 4. Each front wheel is connected with its rear wheel by a connecting rod 6, which is rotatably connected to the wheels by a pin, so that both wheels make the same number of revolutions.

At the front of the frame 3, hooks 7 are arranged, in order to attach the thill; at this part of the frame are also located plough-irons 8 adapted to remove the earth if the same is too loose. At the rear side of the frame 3, two weeding hooks 9 are arranged. In the centre of the frame, two platforms 10 are provided secured to a cross rod which is supported at one end by a wheel 11 and at the other end is attached to the frame. These platforms serve to carry the attendants who place the plants in the holes and also the driver, if no special driver's seat is provided.

In order to be able to adjust the planting spades and the pressing feet exactly, the rims of the wheels may be provided with longitudinal slots. As the planting spades make the holes at the sides of the wheels and the pressing feet are upon the rims of the rear wheels arranged in another vertical plane, these pressing feet will press on the ground at the sides of the holes and by the pressure exerted by them, will close these holes from one side. In this manner the plants are forced to take an upright position.

It is not necessary that the front wheels and the rear wheels be of the same diameter, if care be taken that the distance between the planting pins measured along the arc of the rim of the front wheel is equal to the distance between the pressing feet measured along the circumference of the rim of the rear wheel. So also it is not necessary that the wheels rotate in the same vertical plane if the front and rear wheels be arranged in such a manner that the rear wheels do not rotate in the same plane in which the planting spades rotate.

I claim—

A planting machine for cabbage or other plants comprising a frame, a wheel rotatably mounted on said frame and provided with a plurality of planting spades equally spaced about the periphery thereof and extending therefrom and a second wheel rotatably mounted on said frame behind said first wheel and provided with a plurality of pressing feet equally spaced about the periphery thereof and extending therefrom, said pressing feet being spaced about the periphery of said second wheel a distance equal to the peripheral distance between the planting spades on said first wheel and adapted to rotate in a vertical plane laterally spaced from the vertical plane of rotation of said planting spades, whereby said pressing feet are adapted to exert a sideward pressure to close the holes made by said planting spades.

In testimony whereof I have signed my name to this specification.

THOMAS VAN DEN ENDE.